Patented May 15, 1934

UNITED STATES PATENT OFFICE 1,958,699

PROCESS FOR SECURING COMPOUNDS OF LEAD

Paul Gamichon, Paris, France

No Drawing. Application June 12, 1931, Serial No. 543,821. In France June 19, 1930

2 Claims. (Cl. 23—146)

This invention refers to a process by means of which all lead compounds may be secured, such as basic hydrate and carbonate, lead oxides and salts, which are suited for the chemical and industrial uses of this metal, without passing through the pure metallic stage itself.

Said process consists mainly in precipitating the lead dissolved in a brine, by means of an alkaline or earth-alkaline base and in dechlorinating the mass thereafter by contact with water and a base; the mass thus dechlorinated being subsequently converted either into litharge or into minium by roasting, or into a soluble basic lead salt, by means of an acid, said soluble basic lead salt being itself convertible into a hydrate, carbonate or other compound of lead.

The said process is exemplified below by an illustration which is to be taken as illustrative rather, but not as limiting the scope of the invention:

The starting point is furnished by a solution of chloride of lead in a brine containing at least 270 grammes of sodium or calcium chloride per litre and obtained, for example, in accordance with patent application Serial No. 543,820 dated June 12, 1931 for "Process for the treatment of ores containing lead", or in patent application Serial No. 543,819 dated June 12, 1931 now Patent No. 1,905,460 for "Process for converting into soluble salts lead and metals contained in lead bearing ores".

1000 litres of said brine, containing approximately 20 kg. chloride of lead, are treated at a temperature of approximately 100° C. with 7 kg. slaked lime imported into the solution as a lime-milk. The solution is vigorously stirred and the precipitation of the lead is both immediate and complete.

The precipitate secured is separated, washed with 200 litres of water at 60° C. and is desiccated. It is then treated, at 70° C. with 150 litres of a soda solution of 10° Bé., approximately, and stirred until the enrichment of the liquid in chlorine has ceased.

The dechlorinated mass is then separated from the liquid and washed with water. It is constituted of a mixture of lead hydrate (hydroxide) and lead oxide. It may be used directly for conversion into either litharge or into red lead, as desired by more or less intense roasting, or it may be dissolved in an acid, to supply a soluble basic lead salt. Acetic, nitric or other acid may be used for this purpose according to the end product desired. The quantity of acid used shall be such that an excess of lead oxide remains in its presence, in order to secure, for example, a tri-lead acetate or any other soluble basic salt.

From this soluble basic salt the carbonate may be precipitated by a flow of carbonic gas, or the hydrate may be precipitated by a flow of ammonia.

In the case of the carbonate the acid is recovered directly which serves to reconstitute the basic lead salt.

In the case of the hydrate, the ammonia salt formed is distilled with lime, whereby the ammonia is recovered. On the other hand, the acid is recovered by the action of another acid, such as carbonic acid which forms an insoluble salt with the soluble salt of lime, thereby releasing its acid constituent.

As regards the dechlorination liquor consisting of a solution of plombate and of plombite of sodium in soda, this may be treated with the purpose of precipitating and regenerating its base by chemical means (by the use of carbonic gas, for example) or otherwise.

Where it is desired to produce a less pure product, the process herein referred to may be interrupted when it has reached the stage of dechlorination of the oxychloride directly precipitated from the liquors after the water treatment. The hydrate or oxide thus secured may be converted into basic carbonate by means of a simple flow of carbonic gas $CO_2$.

The process pursuant to the invention does not, of course, preclude the possibility of precipitating by any known means all impurities or metals present in the liquors, either before the precipitation of the oxychloride or subsequent to re-dissolution by an acid.

By means of the same process the various lead salts may be secured, such as sulphates, nitrates, acetates, chromates and the like if the oxychloride, after dechlorination, or the hydrate or carbonate are treated with a suitable acid.

I claim:—

1. A process for obtaining lead compounds from lead without passing through the stage of the metal itself which comprises forming a solution of a lead chloride at about 100 degrees centigrade in a brine, adding a base to said solution whereby oxychloride is precipitated therefrom, treating said oxychloride with water and a base whereby the said oxychloride is dechlorinated and converting the dechlorinated mass into the required lead compound.

2. A process for obtaining lead compounds from lead without passing through the stage of the metal itself which comprises forming a solution of a lead chloride at about 100 degrees centigrade in a brine, adding a base to said solution whereby oxychloride is precipitated therefrom, treating said oxychloride with water and a base whereby the said oxychloride is dechlorinated to obtain a mixture of lead hydrate and oxide and converting the dechlorinated mixture into the required lead compound.

PAUL GAMICHON.